H. R. GOODFELLOW.
DEVICE FOR SHARPENING THE ROTARY CIRCULAR KNIVES OF MEAT SLICING MACHINES AND THE LIKE.
APPLICATION FILED APR. 1, 1912.
1,033,795. Patented July 30, 1912.
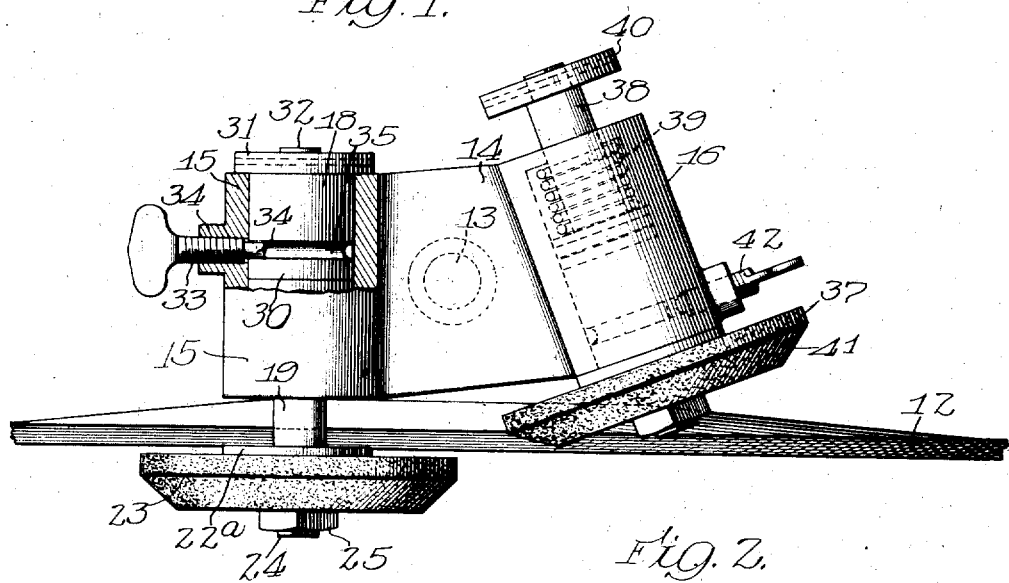
Fig. 1.
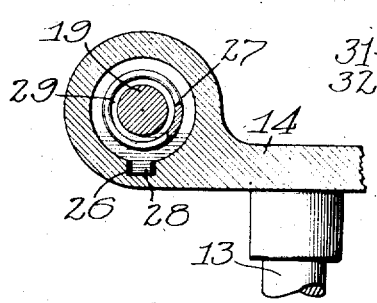
Fig. 3.
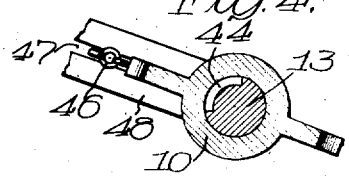
Fig. 4.
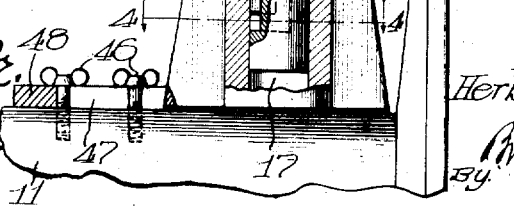
Witnesses:
G. C. Domarus Jr.
Herbert F. Hahn
Inventor:
Herbert R. Goodfellow
By Brown & Hopkins
Attys

UNITED STATES PATENT OFFICE.

HERBERT R. GOODFELLOW, OF CHICAGO, ILLINOIS, ASSIGNOR TO U. S. SLICING MACHINE COMPANY, OF CHICAGO, ILLINOIS, A CORPORATION OF ILLINOIS.

DEVICE FOR SHARPENING THE ROTARY CIRCULAR KNIVES OF MEAT-SLICING MACHINES AND THE LIKE.

1,033,795.  Specification of Letters Patent.  Patented July 30, 1912.

Application filed April 1, 1912. Serial No. 687,795.

*To all whom it may concern:*

Be it known that I, HERBERT R. GOODFELLOW, a subject of the King of England, residing at Chicago, in the county of Cook and State of Illinois, have invented certain new and useful Improvements in Devices for Sharpening the Rotary Circular Knives of Meat-Slicing Machines and the Like, of which the following is a specification.

This invention relates to improvements in devices for sharpening the rotary circular knives of meat slicing machines, and has for its primary object to provide an improved device of this class by means of which the knife may be sharpened in a simple and efficient manner on the machine itself, and which after having been used may be thrown out of action or entirely removed from the machine.

To the attainment of these ends and the accomplishment of other new and useful objects, as will appear, the invention consists in the features of novelty in substantially the construction, combination and arrangement of the several parts hereinafter more fully described and claimed and shown in the accompanying drawing exemplifying the invention, and in which—

Figure 1 is a top plan view partly in section of an improved device of this class, constructed in accordance with the principles of this invention, and with parts omitted. Fig. 2 is a view partly in elevation, partly in longitudinal section, and with parts broken away, of the device shown in Fig. 1. Fig. 3 is an enlarged sectional detail view of one of the bearings, showing one of the spindles in section and the washer against which the spring rests. Fig. 4 is a sectional view on line 4—4 Fig. 2.

Referring more particularly to the drawing, and in the present exemplification of this invention, the numeral 10 designates an upright which is mounted upon a portion 11 of the machine and the upright is preferably arranged adjacent the rear or beveled face of the rotary circular knife 12, which latter is arranged to rotate on a horizontal axis. The upright 10 is provided with a longitudinal opening therein to receive a stem 13 which is connected with a bearing member designated generally by the reference numeral 14, and which member 14 is preferably formed as an integral structure and is provided with bearings 15, 16. The bearing 16 is arranged at an angle with respect to the bearing 15, and these bearings are arranged horizontally and are supported at the upper end of the stem 13, which latter is adapted to enter the longitudinal opening 17 in the upright 10 for holding the bearing member 14 in position. A collar 18$^a$ is connected with the stem 13, and is adapted to rest upon the upper end of the upright 10 for holding the parts in operating and inoperating positions. Slidably mounted in the bearing 15 is a spindle 18 which is provided with a reduced portion 19 to form a shoulder 20. The portion 18 is of a size to fit snugly within the bearing 15 and the portion 19 passes through an aperture in the end wall 21 of the bearing 15, and which wall is located adjacent the knife 12. The portion 19 of the spindle is provided with a shoulder portion 22 against which a washer 22$^a$ rests, and against which washer a rotary grinder 23 rests, and this grinder is secured to the spindle to rotate therewith in any suitable manner, preferably by means of the reduced extremity 24 of the spindle which forms the shoulder 22 and which portion 24 passes through an aperture in the grinder, so that the shoulder 22 will rest against one face of the washer. The washer is held against the said shoulder by means of the gearing, the latter being forced against the washer by a nut or collar 25 engaging the threaded extremity 24 of the spindle. The bearing 15 is provided with an interior groove or way 26 extending inwardly from the open end thereof, and a washer 27 is arranged in the bearing and is of a size to substantially fit the bearing. This washer is provided with a tongue or projecting portion 28 adapted to enter the groove or way 26 so as to hold the washer 27 against rotation in the bearing as shown more clearly in Fig. 3. Arranged between the washer 27 and the end wall 21 of the bearing 15 is an elastic member 29 preferably in the form of a coil spring and an anti-friction bearing preferably in the form of a ball bearing, designated generally by the reference numeral 30, is arranged on the portion 19 of the spindle adjacent the shoulder 20, and between the said shoulder and the washer 27. The spindle is held against displacement through the open end of the bearing in any suitable manner, preferably by means of a collar 31, which is secured to the extremity or to a reduced portion 32 of the portion 18 of the spindle in any suitable manner, and is of a size greater than the diameter of the bearing, so as to engage and rest against the end of the bearing when the elastic member 29 is compressed and the grinder 26 shoved forwardly out of engagement with the flat face of the knife.

In order to hold the grinder 23 out of engagement with the face of the knife 12 the spindle is shifted longitudinally in its bearing, which will shift the grinder 23 laterally and will compress the spring 29. To maintain the parts in this position a holding device, preferably in the form of a pin, designated generally by the reference number 33, is threaded through a portion 34 of the bearing 15, and is provided with a reduced portion 34 which enters a groove 35 formed in the portion 18 of the spindle, and also in a semi-circular groove 36 formed in the bearing and which coöperates with the groove 35 in the spindle so that when the holding device 33 is screwed inwardly to project the portion 34 into the coöperating grooves, the spindle and the grinding device will be held in inoperative position. When it is desired to grind the face of the knife, the holding device 33 is screwed out so as to remove the portion 34 from the groove 35 in the spindle, at which time the elastic member 29 will exert its stress upon the washer 27, and will force the latter against the ball bearing 30, which in turn is forced against the shoulder 20 of the spindle, and the grinding device 23 will be shifted laterally. A grinding device 37 is also provided with a spindle 38 which is constructed in the same manner as the spindle of the grinding device 23, and an elastic member 39, similar to elastic member 29, is provided in the bearing 16 for controlling the movement of the sharpening device 37, and the spindle 38 thereof is held against accidental displacement by means of a collar 40, similar to collar 31. The grinding device 37, however, is arranged on the opposite side of the knife 12, and is provided with a beveled portion 41, adapted to act on the bevel portion 42 of the knife 12 and owing to the angularity of the bearing 16 with respect to the bearing 15 the grinding device 37 will be arranged at an angle with respect to the grinding device 23, and in a position to correspond with the bevel 42 of the knife. The springs 29 and 39 are so arranged that they operate upon the respective grinding devices to move them in a direction toward each other, and a holding device 42, similar to the holding device 33, is provided for holding the grinding device 37 out of the engagement with the knife 12 and against the tension of the spring 39. When these grinding devices are in engagement with the knife they are rotated by the knife.

When it is desired to move the entire grinding device to a position to be out of the way of the knife, so that access may be readily had to the knife for cleaning, etc., the whole bearing 14 together with the grinding devices 23, 37, are raised bodily so as to shift the stem 13 in the bearing 17. When in operation the stem 13 may be held against rotation in any suitable manner, preferably by means of a thumb screw 42, which is threaded through the upright to project into the bearing 17, and into a longitudinal slot 43 in the stem, which latter being circular in cross section would rotate were it not held against such rotation.

After the completion of the grinding operation, and as above noted, when it is desired to swing the sharpening devices away from the knife, the whole device is raised to cause the stem 13 to slide in the bearing 17 in the upright until the entrance opening of a bayonet slot 44 is positioned adjacent the extremity of the thumb screw 42, after which the stem 13 may be rotated in its bearing to cause the thumb screw 42 to enter the bayonet slot 44, which will bring the grinding devices to a position back of the knife 12. After they have been thus positioned they may be released so that they will be lowered and the end of the thumb screw 42 will be seated in the bayonet slot 44 to lock the stem 13 against rotation. The bayonet slot 44 may be of such a length as to permit the collar 18ª to engage and rest upon the upper end of the upright 10.

The collar 18ª on the stem 13 is adjustably secured thereto by means of a thumbscrew 45 by means of which the collar may be adjusted longitudinally on the stem and thereby vary the position of the grinders in a vertical plane with respect to the knife.

The support 10 together with the stem 13 and the structure supported thereby are adapted to be moved laterally with respect to the knife and for this purpose the support is adjustably secured to the portion 11 of the machine in any suitable manner and for lateral adjustment thereon, such as by means of thumbscrews 46 which pass through a slot 47 in an extension 48 on the support 10 at which thumbscrews enter the portion 11 of the machine. By means of this adjustment it will be manifest that the structure may be so positioned that one of the grinders may bear with greater force upon its respective side of the knife than the other grinder.

What is claimed as new is:—

1. A device for sharpening the rotary circular knife of meat slicing machines, comprising in combination a sharpener for the front of the knife, a sharpener for the back of the knife, a support for the sharpeners, said sharpeners being operable independently of each other and by the engagement of the knife therewith, said sharpeners being movable both into and out of engagement with the knife independently of each other, and a holding device individual to each of the sharpeners for independently controlling such movements.

2. A device for sharpening the rotary circular knife of meat slicing machines, comprising in combination a sharpener for the front of the knife, a sharpener for the back of the knife, a support for the sharpeners, said sharpeners being operable independently of each other and by the engagement of the knife therewith, said sharpeners being laterally movable both into and out of engagement with the knife independently of each other and means individual to the sharpeners for independently controlling such movements.

3. A device for sharpening the rotary circular knife of meat slicing machines, comprising in combination a sharpener for the front of the knife, a sharpener for the back of the knife, a support for the sharpeners, said sharpeners being operable independently of each other and by the engagement of the knife therewith, said sharpeners being movable into and out of engagement with the knife independently, yielding means acting on one side of each of the sharpening devices, and means other than the same yielding means individual to the sharpeners for independently controlling such movements.

4. A device for sharpening the rotary circular knife of meat slicing machines, comprising in combination a sharpener for the front of the knife, a sharpener for the back of the knife, a support for the sharpeners, said sharpeners being operable independently of each other and by the engagement of the knife therewith, said sharpeners being laterally movable into and out of engagement with the knife independently, yielding means acting on one side of each of the sharpening devices, and normally inactive means individual to the sharpening devices and adapted to be rendered active for independently locking them from lateral movement in one direction.

5. A device for sharpening the rotary circular knives of meat slicing machines, embodying a rotatable sharpener adapted to act on the face of the knife, a rotatable sharpener adapted to act on the back of the knife, means for carrying the sharpeners, means individual to the sharpeners for moving them into engagement with the knife, independently of each other and means individual to the sharpeners for holding them out of engagement with the knife individually.

6. A device for sharpening the rotary circular knives of meat slicing machines embodying a rotatable sharpener adapted to act on the face of the knife, a rotatable sharpener adapted to act on the back of the knife, means for carrying the sharpeners, means individual to the sharpeners for moving them laterally and into engagement with the knife, and means individual to the sharpeners for holding them out of engagement with the knife and against the tension of the last recited means individually and independently with respect to each other.

7. A device for sharpening the rotary circular knives of meat slicing machines, embodying a rotatable sharpener adapted to act on the face of the knife, a rotatable sharpener adapted to act on the back of the knife, means for carrying the sharpeners, means individual to the sharpeners for moving them into engagement with the knife independently of each other, and means individual to the sharpeners for holding them out of engagement with the knife independently of each other, the axis of rotation of one of the sharpeners being arranged at an angle with respect to the axis of rotation of the other sharpener.

8. A device for sharpening the rotary circular knives of meat slicing machines, embodying a rotatable sharpener adapted to act upon one side of the knife, a rotatable sharpener adapted to act upon the other side of the knife, yielding means arranged on one side of each of the sharpeners for individually moving them laterally in one direction, and a holding device for each of the sharpeners respectively holding them out of engagement with the knife independently of each other.

9. A device for sharpening the rotary circular knives of meat slicing machines, embodying a rotatable sharpener adapted to act upon one side of the knife, a rotary sharpener adapted to act on the other side of the knife, yielding means individual to of the sharpeners and tending normally to move them in a direction toward each other, and a holding device for each of the sharpeners for holding them against the action of their respective yielding means and independently with respect to each other.

10. A device for sharpening the rotary circular knives of meat slicing machines, embodying a rotatable sharpener adapted to act upon one side of the knife, a rotary sharpener adapted to act on the other side of the knife, yielding means individual to the sharpeners tending normally to move them laterally and in a direction toward each other, and a locking pin for each of the sharpeners for locking them against the action of the respective yielding means.

11. A device for sharpening the rotary circular knives of meat slicing machines embodying a rotatable sharpener adapted to act upon one side of the knife, a rotary sharpener adapted to act on the other side of the knife, yielding means individual to the sharpeners tending normally to move them in a direction toward each other, and a holding device for each of the sharpeners for holding them against the action of their respective yielding means, and independently with respect to each other the axes of rotation of the said sharpening devices being arranged at an angle to each other, and said devices being rotatable by the knife when in engagement therewith.

12. A device for sharpening the rotary circular knife of a slicing machine embodying a rotatable sharpener, a bearing for the sharpener, a support for the bearing and upon which the bearing is adjustably mounted for movement in a direction to move the sharpener above the knife, means whereby the bearing may be shifted when thus moved, to position the sharpener away from the knife, and means for holding the parts in the last recited position the last said means embodying a pin and slot connection between the bearing and support.

13. A device for sharpening the rotary circular knife of a slicing machine embodying a rotatable sharpener, a bearing for the sharpener, a support, and a stem connected with the bearing and movable longitudinally, said stem being adapted to be rotated to shift the bearing and thereby move the sharpener bodily to one side of the knife, said stem and bearing being provided one with a projection and the other with a slot for receiving the projection for maintaining the sharpener and bearing in the last recited position.

14. A device for grinding the rotary circular knife of a slicing machine, embodying a rotatable sharpener, a bearing for the sharpener, a support, a stem connected with the bearing and movable longitudinally, said stem being adapted to be rotated to shift the bearing and thereby move the grinder bodily to one side of the knife, and means for locking the bearing in its shifted position when the said stem is moved in the opposite direction, the said means embodying pin and slot connection between the bearing and stem.

15. A grinding device embodying a rotatable grinder, a spindle connected therewith, a bearing for the spindle, said spindle having a shoulder within the bearing and said bearing also having a shoulder coöperating with the first said shoulder, a washer in the bearing adjacent the spindle shoulder, an elastic member between the washer and the bearing shoulder and tending to shift the spindle longitudinally, means for locking the spindle against such movement, and means for preventing displacement of the spindle with respect to the bearing.

16. A grinding device embodying a rotatable grinder, a spindle connected therewith, a bearing for the spindle, said spindle having a shoulder within the bearing and said bearing also having a shoulder coöperating with the first said shoulder, a washer in the bearing adjacent the spindle shoulder, a tongue and groove connection between the washer and the bearing, an elastic member between the washer and the bearing shoulder tending to shift the spindle longitudinally, means for locking the spindle against such movement, and means for preventing displacement of the spindle with respect to the bearing, said grinder being rotatable by the movement of the article being ground, when in engagement therewith.

In testimony whereof I have signed my name to this specification, in the presence of two subscribing witnesses, on this 29th day of March A. D. 1912.

HERBERT R. GOODFELLOW.

Witnesses:
J. H. JOCHUM, Jr.,
CHARLES H. SEEM.

---

It is hereby certified that in Letters Patent No. 1,033,795, granted July 30, 1912, upon the application of Herbert R. Goodfellow, of Chicago, Illinois, for an improvement in "Devices for Sharpening the Rotary Circular Knives of Meat-Slicing Machines and the Like," errors appear requiring correction as follows: In the heading to the drawing, for the date "July 30, 191" read *July 30, 1912;* and in the printed specification, page 3, line 34, for the word "same" read *said;* and that the said Letters Patent should be read with these corrections therein that the same may conform to the record of the case in the Patent Office.

Signed and sealed this 17th day of September, A. D., 1912.

[SEAL.]

C. C. BILLINGS,
*Acting Commissioner of Patents.* bodying a rotatable sharpener adapted to act upon one side of the knife, a rotary sharpener adapted to act on the other side of the knife, yielding means individual to the sharpeners tending normally to move them in a direction toward each other, and a holding device for each of the sharpeners for holding them against the action of their respective yielding means, and independently with respect to each other the axes of rotation of the said sharpening devices being arranged at an angle to each other, and said devices being rotatable by the knife when in engagement therewith.

12. A device for sharpening the rotary circular knife of a slicing machine embodying a rotatable sharpener, a bearing for the sharpener, a support for the bearing and upon which the bearing is adjustably mounted for movement in a direction to move the sharpener above the knife, means whereby the bearing may be shifted when thus moved, to position the sharpener away from the knife, and means for holding the parts in the last recited position the last said means embodying a pin and slot connection between the bearing and support.

13. A device for sharpening the rotary circular knife of a slicing machine embodying a rotatable sharpener, a bearing for the sharpener, a support, and a stem connected with the bearing and movable longitudinally, said stem being adapted to be rotated to shift the bearing and thereby move the sharpener bodily to one side of the knife, said stem and bearing being provided one with a projection and the other with a slot for receiving the projection for maintaining the sharpener and bearing in the last recited position.

14. A device for grinding the rotary circular knife of a slicing machine, embodying a rotatable sharpener, a bearing for the sharpener, a support, a stem connected with the bearing and movable longitudinally, said stem being adapted to be rotated to shift the bearing and thereby move the grinder bodily to one side of the knife, and means for locking the bearing in its shifted position when the said stem is moved in the opposite direction, the said means embodying pin and slot connection between the bearing and stem.

15. A grinding device embodying a rotatable grinder, a spindle connected therewith, a bearing for the spindle, said spindle having a shoulder within the bearing and said bearing also having a shoulder coöperating with the first said shoulder, a washer in the bearing adjacent the spindle shoulder, an elastic member between the washer and the bearing shoulder and tending to shift the spindle longitudinally, means for locking the spindle against such movement, and means for preventing displacement of the spindle with respect to the bearing.

16. A grinding device embodying a rotatable grinder, a spindle connected therewith, a bearing for the spindle, said spindle having a shoulder within the bearing and said bearing also having a shoulder coöperating with the first said shoulder, a washer in the bearing adjacent the spindle shoulder, a tongue and groove connection between the washer and the bearing, an elastic member between the washer and the bearing shoulder tending to shift the spindle longitudinally, means for locking the spindle against such movement, and means for preventing displacement of the spindle with respect to the bearing, said grinder being rotatable by the movement of the article being ground, when in engagement therewith.

In testimony whereof I have signed my name to this specification, in the presence of two subscribing witnesses, on this 29th day of March A. D. 1912.

HERBERT R. GOODFELLOW.

Witnesses:
J. H. JOCHUM, Jr.,
CHARLES H. SEEM.

---

It is hereby certified that in Letters Patent No. 1,033,795, granted July 30, 1912, upon the application of Herbert R. Goodfellow, of Chicago, Illinois, for an improvement in "Devices for Sharpening the Rotary Circular Knives of Meat-Slicing Machines and the Like," errors appear requiring correction as follows: In the heading to the drawing, for the date "July 30, 191" read *July 30, 1912;* and in the printed specification, page 3, line 34, for the word "same" read *said;* and that the said Letters Patent should be read with these corrections therein that the same may conform to the record of the case in the Patent Office.

Signed and sealed this 17th day of September, A. D., 1912.

[SEAL.]

C. C. BILLINGS,
*Acting Commissioner of Patents.*

It is hereby certified that in Letters Patent No. 1,033,795, granted July 30, 1912, upon the application of Herbert R. Goodfellow, of Chicago, Illinois, for an improvement in "Devices for Sharpening the Rotary Circular Knives of Meat-Slicing Machines and the Like," errors appear requiring correction as follows: In the heading to the drawing, for the date "July 30, 191" read *July 30, 1912;* and in the printed specification, page 3, line 34, for the word "same" read *said;* and that the said Letters Patent should be read with these corrections therein that the same may conform to the record of the case in the Patent Office.

Signed and sealed this 17th day of September, A. D., 1912.

[SEAL.]

C. C. BILLINGS,
*Acting Commissioner of Patents.*